US012769442B2

(12) United States Patent
Guo et al.

(10) Patent No.: US 12,769,442 B2
(45) Date of Patent: Oct. 20, 2026

(54) HARDWARE INTERACTION PROXY FOR ACCESSING TOUCHSCREENS

(71) Applicant: The Regents of The University of Michigan, Ann Arbor, MI (US)

(72) Inventors: Anhong Guo, Ann Arbor, MI (US); Alanson Sample, Ann Arbor, MI (US); Ruijie Geng, Ann Arbor, MI (US); Thomas Krolikowski, Ann Arbor, MI (US); Yasha Iravantchi, Ann Arbor, MI (US); Chen Liang, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/816,229

(22) Filed: Aug. 27, 2024

(65) Prior Publication Data

US 2025/0077068 A1 Mar. 6, 2025

Related U.S. Application Data

(60) Provisional application No. 63/535,185, filed on Aug. 29, 2023.

(51) Int. Cl.

| | |
|---|---|
| ***G06F 3/0488*** | (2022.01) |
| ***G06F 3/041*** | (2006.01) |
| ***G06F 3/044*** | (2006.01) |
| *G06F 3/042* | (2006.01) |

(52) U.S. Cl.

CPC ........ *G06F 3/0488* (2013.01); *G06F 3/04162* (2019.05); *G06F 3/044* (2013.01); *G06F 3/0425* (2013.01)

(58) Field of Classification Search

CPC .... G06F 3/0488; G06F 3/04162; G06F 3/044; G06F 3/0425

See application file for complete search history.

(56) References Cited

U.S. PATENT DOCUMENTS 9,373,302 B2 * 6/2016 Walker .................. G06F 3/0488
9,411,507 B2 8/2016 Moore
9,710,061 B2 7/2017 Pance et al.

(Continued)

*Primary Examiner* — Lisa S Landis

(74) *Attorney, Agent, or Firm* — Harness, Dickey & Pierce, P.L.C.

(57) ABSTRACT

Touchscreen devices, designed with an assumed range of user abilities and interaction patterns, often present challenges for individuals with diverse abilities to operate independently. Prior efforts to improve accessibility through tools or algorithms necessitated alterations to touchscreen hardware or software, making them inapplicable for the large number of existing legacy devices. This disclosure introduces a hardware interaction proxy that performs physical interactions on behalf of users while allowing them to continue utilizing accessible interfaces, such as screen readers and assistive touch on smartphones, for interface exploration and command input. The proxy maintains an interface model for accurate target localization and utilizes exchangeable actuators for physical actuation across a variety of device types, effectively reducing user workload and minimizing the risk of mistouch. Evaluations reveal that this approach lowers the mistouch rate and empowers visually and motor impaired users to interact with otherwise inaccessible physical touchscreens more effectively.

6 Claims, 9 Drawing Sheets

(56) References Cited

U.S. PATENT DOCUMENTS

| | | | |
|---|---|---|---|
| 10,645,439 B2 | 5/2020 | Card, II et al. | |
| 2022/0270512 A1 | 8/2022 | Dialameh et al. | |
| 2023/0161443 A1* | 5/2023 | Ziraknejad | B66B 1/461<br>327/517 |

* cited by examiner

Exploration Mode (Left) and Grid-Based Audio Guidance (Right) with Voiceover

Button Magnifier Mode Showing Nearby Buttons (Left) and Directional Guidance (Right)

Interaction Routine Mode for Sequential Button Input

HARDWARE INTERACTION PROXY FOR ACCESSING TOUCHSCREENS

CROSS-REFERENCE TO RELATED APPLICATIONS

This application claims the benefit and priority of U.S. Provisional Application No. 63/535,185 filed on Aug. 29, 2023. The entire disclosure of the above application is incorporated herein by reference.

FIELD

The present disclosure relates to interaction proxy device for interfacing with touchscreens.

BACKGROUND

Touchscreen devices have become ubiquitous in everyday life, playing a critical role in performing various everyday tasks. From flight check-in kiosks to food ordering systems, interacting with these devices has become essential to independently completing tasks. However, despite their widespread adoption, such devices are often designed with assumptions about users' abilities and interaction patterns, making them less accessible to completely inaccessible for users with diverse abilities. Individuals with visual impairments may have difficulty perceiving the necessary information to operate these touchscreens, and the risk of triggering unintended actions due to mistouches during interaction may bring additional concerns while using them. Furthermore, the precision and force required to register touch events on many touchscreen devices (especially in the case of resistive touch screens) may pose additional challenges for individuals with motor impairments, such as cerebral palsy, thus limiting their ability to use these devices independently.

Prior research has explored various solutions to enhance the accessibility of touchscreen devices. For example, several approaches have been proposed to improve touchscreen interaction experience for motor-impaired users through the concept of ability-based design. These include modifying touch detection algorithms to better recognize users' input gestures or adapting the interface to support additional input gestures. However, these methods often require hardware or software modifications of existing touchscreen devices, making them inapplicable to a large number of inaccessible devices that are already in use. Other systems aim to make graphical interface content more accessible and provide camera-based guidance for visually impaired individuals to navigate and actuate touchscreen appliances. However, these solutions still necessitate precise interactions from users, where the risk of mistouches still remains a concern.

Inspired by prior work on software interaction proxies and accessibility tools for touchscreen interactions, this disclosure focuses on making the interaction more accessible and risk-free through the concept of hardware interaction proxies, which introduces an intermediary layer between the user and the inaccessible touchscreen devices. Specifically, the proxy should perceive and interpret the user interface and convert to an accessible format for users to explore, locate target UI elements and give meaningful feedback for users to navigate on the interface, and actuate the interface on behalf of the user. This allows users to interact with the device using a more accessible interface such as screenreaders and touch assistive on smartphones, delegating the tasks of interpreting, locating, and actuating inaccessible touchscreen interfaces to the proxy, ultimately reducing user workload and minimizing the risk of mistouch.

This section provides background information related to the present disclosure which is not necessarily prior art.

SUMMARY

This section provides a general summary of the disclosure, and is not a comprehensive disclosure of its full scope or all of its features.

This disclosure presents a technique for accessing a touchscreen using an interaction proxy device. Through the use of the interaction proxy device, the method includes: determining content displayed on a touchscreen; exposing the content to a user of the interaction proxy device; detecting an input from the user, where the input indicates a command for the touchscreen; and activating a user interface element of the touchscreen in response to detecting the input from the user.

In one embodiment, the interaction proxy device is comprised of: a camera; at least one user interface component; an actuator configured to interact with a touchscreen; a touchscreen interface; and a controller. The touchscreen interface is configured to determine content displayed on the touchscreen and expose the content to a user via the user interface component. The controller is configured to receive input from the user and actuates the actuator in response to receiving the input, where the input indicates a command for the touchscreen.

The controller is interfaced with the camera and operates to determine location of the touchscreen in relation to the proxy device using input from the camera. In some embodiments, the interaction proxy device further comprises one or more motion sensors. In these embodiments, the controller is also interfaced with the one or more motion sensors and determines location of the touchscreen in relation to the proxy device in part based on input from the one or more motion sensors.

In some embodiments, the actuator is further defined as a solenoid, such that the controller supplies current to the solenoid to actuate the solenoid. In other embodiments, the actuator is further defined as a capacitance circuit, such that the controller supplies voltage to the capacitance circuit and thereby activates a user interface element on the touchscreen.

In an alternative embodiment, the proxy system for interfacing with a touchscreen is comprised of a handheld computing device and a case configured to encase the handheld computing device. The handheld computing device includes: a camera, a user interface component, and a controller, where the controller determines content displayed on the touchscreen and exposes the content to a user via the user interface component. The case includes a microcontroller and an actuator for interacting with the touchscreen. During operation, the controller receives input from the user, translates the input to a command for the touchscreen and communicates the command to the case. The microcontroller in turn receives the command from the handheld computing device and actuates the actuator in response to receiving the command.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
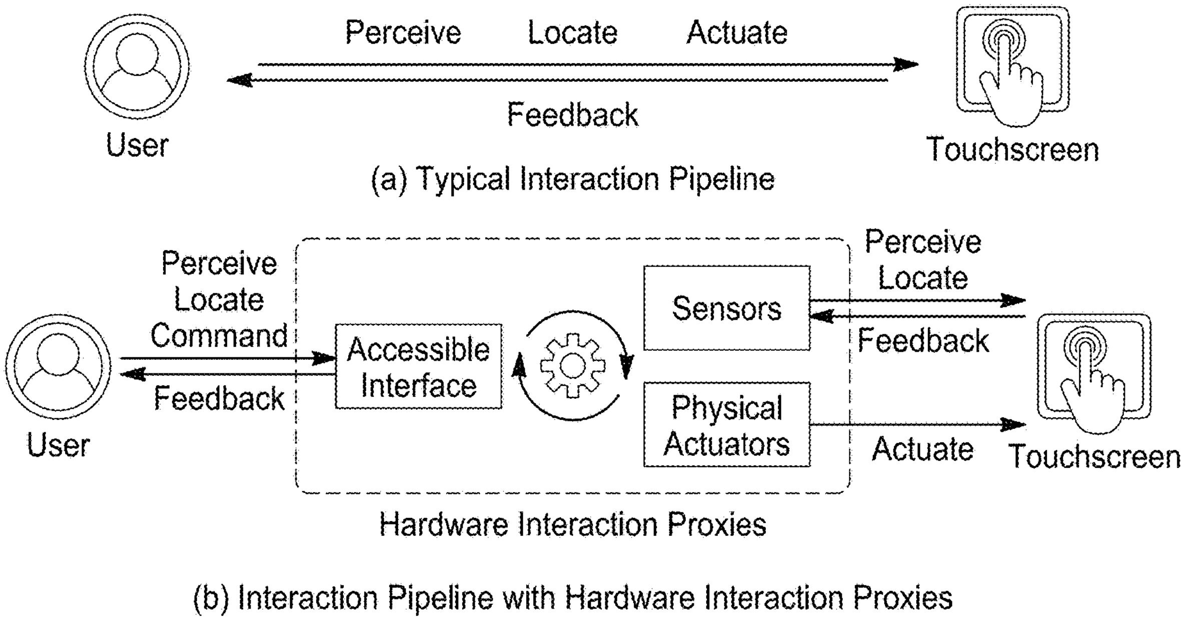
FIG. 1 is a diagram showing the typical touchscreen interaction.

The idea of hardware interaction proxies (which we referred to as "proxies" below) aim to act as bridging tools between users (and their preferred assistive technologies) and the target interaction device. Referring to FIG. 1, a typical interaction pipeline requires users to perceive and interpret screen content, locate target interface elements, and actuate the screen accordingly. Screens will in return provide certain feedback for users' interaction. However, this pipeline is based on various ability assumptions, including assumptions made by touchscreen devices about users' ability to perceive, locate, and actuate interface elements, and the assumptions made by users about devices' ability to interpret their interaction intentions, and give feedback that is accessible to them.

To bridge this gap about ability assumptions, hardware interaction proxies can act as a middle layer to transform information and intentions from each side, into a more accessible and interpretable format to the other side. Specifically, it would allow both sides to offload tasks that require ability assumptions to the proxies, which includes the following three major parts: perception and localization, actuation, and accessible interface.

First, proxies should be able to effectively retrieve the information on the inaccessible touchscreen and represent it to the user in an accessible manner. It should also be able to locate interface elements, as well as itself, relative to the interface to provide useful and accessible feedback for users.

Second, proxies should be able to perform actuation on behalf of the users. Users should be able to initiate the actuation through accessible interfaces, and proxies should perform the actuation in a way that is interpretable by touchscreen devices. Collectively with the localization module, actuation should be performed precisely on the desired target to avoid interaction risks, and should response fast enough to offset the needs of fine motor control and precise movement from the user.

Third, proxies should provide interfaces that is accessible for people with diverse abilities and needs. Through the accessible interface, users should be able to perceive target touchscreen interface information, get directional guidance and feedback from proxies, and interact with and physically move the device. Information it provides should be accessible based on users' needs to preserve privacy and social concerns.

Based on findings from prior research, specific design considerations that hardware interaction proxy should aim to achieve throughout the interaction pipeline are summarized below.

Proxies should be able to accurately actuate touchscreen devices, and reduce the concerns from visually and motor impaired users about potential risks, including worries about mistouches and knowing and correcting mistakes.

Proxies should be able to support different kinds of interactions that needs accessibility support, including different target device technologies (e.g., capacitive touchscreens, resistive touchscreens, physical touchpads) and gestures (e.g., tap, swipe), covering a wide range of accessibility needs in daily life.

Proxies should act as a proxy between inaccessible devices and users (and their accessible devices) requiring minimum changes to either of them. This allows higher compatible with diverse set of legacy touchscreen devices, and enable users to use assistive technology they already mastered to interact with these inaccessible touchscreens, which reduces users concern of unable to find needed support relevant to that hardware/software.

Proxies should interact with the screen with similar or higher level of privacy as direct interaction to reduce privacy concerns of typing sensitive information in public spaces when visually and motor impaired users use assistive technology. It should also be used following the social concerns and etiquette as required by the user (e.g., loud audio feedback, noise it generates).

Proxies should be easy to carry around, attach and detach to existing accessible devices, and requires minimum setup to be used directly, to reduce the concern of limited portability of the assistive technology.

Figure 2:
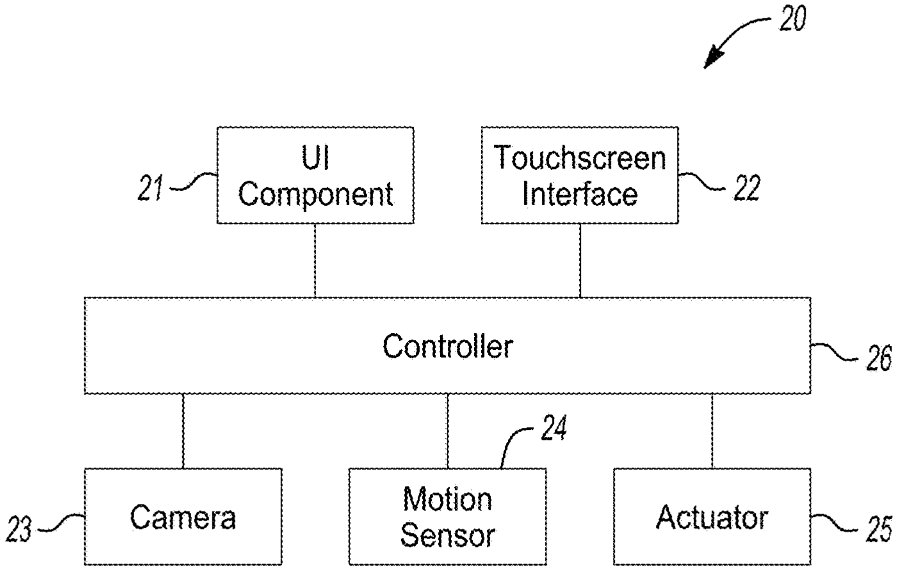
FIG. 2 is a diagram of an interaction proxy device for interfacing with a touchscreen.

FIG. 2 depicts an interaction proxy device 20 for interfacing with a touchscreen. The interaction proxy device 20 is comprised of: a camera 23, at least one user interface component 21, an actuator 25, a touchscreen interface 22 and a controller 26. The interaction proxy device 20 may further include one or more motion sensors 24. In some implementations, the proxy device 20 is a standalone device, such as a mobile phone or tablet. It is to be understood that the relevant components of the proxy device are discussed in relation to FIG. 2, but that other components may be needed to control and manage the overall operation of the system.

The touchscreen interface 22 is configured to determine content displayed on a touchscreen and expose the content to a user via the user interface component 21. Suitable techniques for determine content displayed on a touchscreen and expose the content to a user are known in the art. For further details regarding exemplary techniques, reference may be had to Anhong Guo et. al., StateLens: A Reverse Engineering Solution for Making Existing Dynamic Touchscreens Accessible. In Proceedings of the 32nd Annual ACM Symposium on User Interface Software and Technology (New Orleans, LA, USA) (UIST '19). Association for Computing Machinery, New York, NY, USA, 371-385 which is incorporated by reference herein. In one example, the user interface component is further defined as a display, such that the content is shown to the user on the display. In another example, the user interface components is a microphone and/or speaker, such that the content is audibly communicated to the user. Other types and different combinations of user interface components for engaging the user are contemplated by this disclosure.

In one example, the touchscreen interface 22 is a software module that receives images of the touchscreen from the camera and determines the content from the images. In another example, the touchscreen interface 22 is a wireless transceiver that receives data indicative of the displayed content wirelessly from the touchscreen. The touchscreen interface 22 may have access to an interface model stored in a non-transitory storage device. The interface model includes the content displayed by the touchscreen and the touchscreen interface determines the content displayed on the touchscreen using the interface model.

Based on the content exposed to the user by the touchscreen interface, the controller 26 is configured to receive input from the user and actuates the actuator 25 in response to receiving the input, where the input indicates a command for the touchscreen. Different interfaces for receiving input from the user are known in the art. For example, the Vision feature to assist visually impaired users and the Assistive Touch feature to assist users with motor impairment; both of these features are found in Apple products.

To translate an input to a command for the touchscreen, the proxy device store interface layout information for the touchscreen in a database, including the type of the interface item (e.g., a text label, or a button), the location of the interface item, and associated textual information for the interface item (e.g., the text on the button). Whenever a user selects an interface item, the system retrieves the type of the interface item to decide what action to take (e.g., if the interface item is a button, then the proxy device needs to click it, or if the interface item is merely a label, then no actuation will be triggered). The prosy device may also generate directional guidance for users to move the proxy device proximate to the interface item on the touchscreen. In this way, the proxy device translates a user input (clicking something on the accessible interface on their smartphone) to a sequence of commands for the proxy device to interact with the target touchscreen.

The proxy device 20 may implement different types of actuators. In one example, the actuator 25 is further defined as a solenoid and the controller 26 supplies current to the solenoid to actuate the solenoid. In another example, the actuator 25 is further defined as a capacitance circuit and the controller 26 supplies voltage to the capacitance circuit, thereby activating a user interface element on the touchscreen. Other types of actuators may be suitable for interacting with a touchscreen. Moreover, the proxy device may include an array of actuators integrated into a surface thereof. In this way, the actuation area is increased and reduces the need for fine motor control by the user.

During operation, the controller 26 of the interaction proxy device 20 operates to determine the location of the touchscreen in relation to the proxy device. Input from the camera 23 may be used to locate the touchscreen. Additionally or alternatively, the controller 26 is interfaced with the one or more motion sensors 24 and determines location of the touchscreen in relation to the proxy device in part based on input from the one or more motion sensors 24.

In an exemplary embodiment, the controller 26 is implemented as a microcontroller. It should be understood that the logic for the control of proxy device 20 by its controller 26 can be implemented in hardware logic, software logic, or a combination of hardware and software logic. In this regard, controller 26 can be or can include any of a digital signal processor (DSP), microprocessor, microcontroller, or other programmable device which are programmed with software implementing the above described methods. It should be understood that the controller 26 may include other logic devices, such as a Field Programmable Gate Array (FPGA), a complex programmable logic device (CPLD), or application specific integrated circuit (ASIC). When it is stated that controller 26 performs a function or is configured to perform a function, it should be understood that the controller 26 is configured to do so with appropriate logic (such as in software, logic devices, or a combination thereof).

Figure 3:
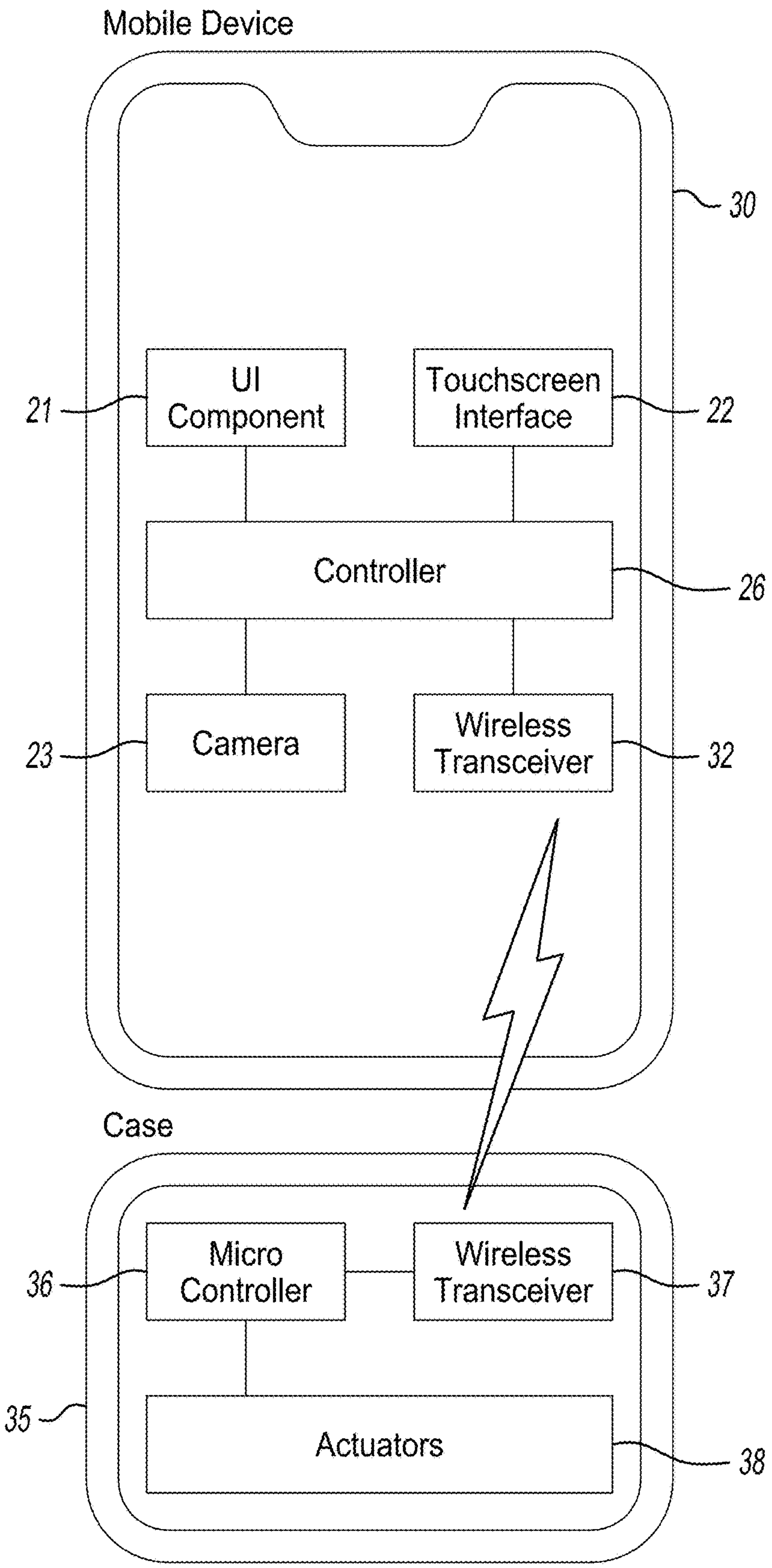
FIG. 3 is a diagram of an alternative implementation of an interaction proxy system comprised of a handheld computing device and a case.
Figure 4:
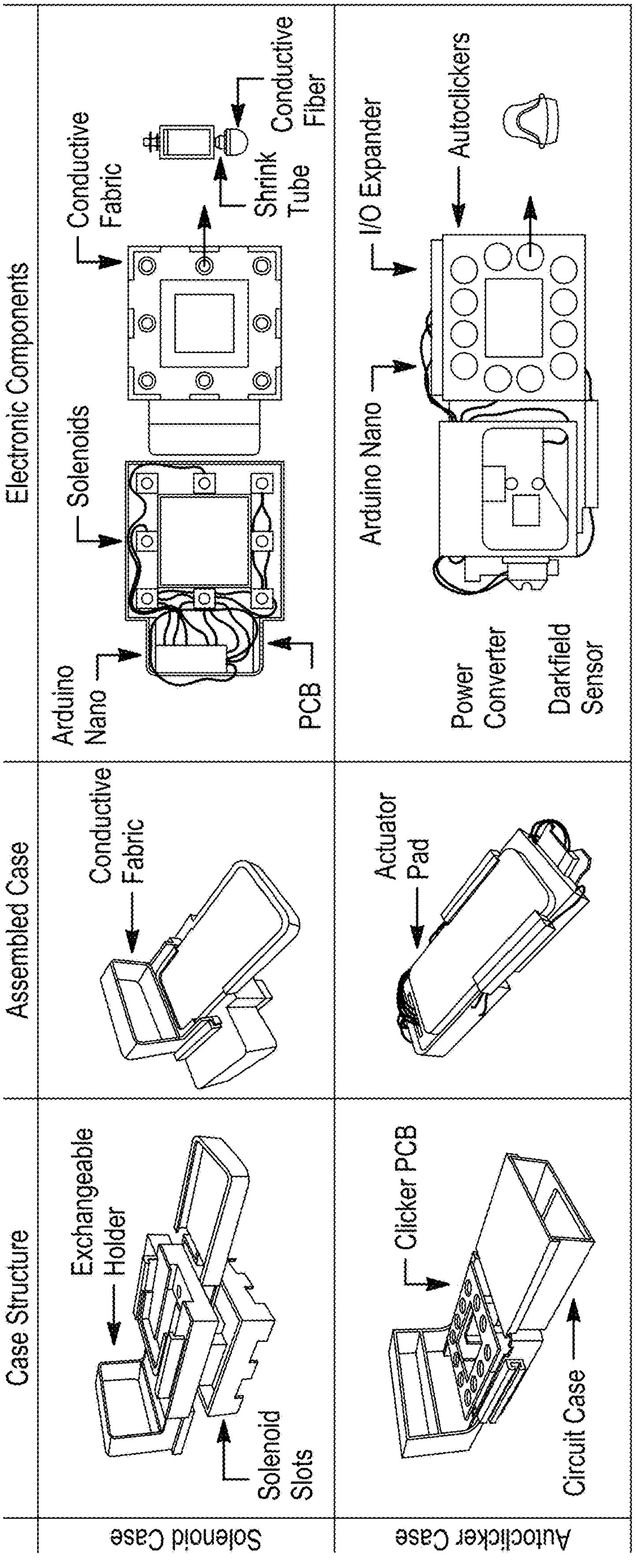
FIG. 4 illustrates example implementations for phone case having solenoid actuators.
Figure 5A:
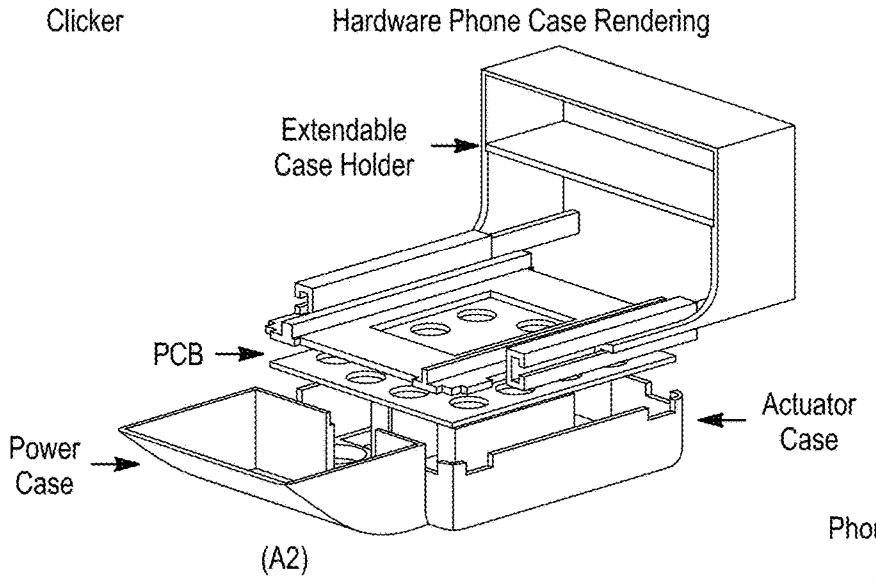
FIGS. 5A-5D illustrate an example implementation for phone case having capacitive actuators.
Figure 5B:
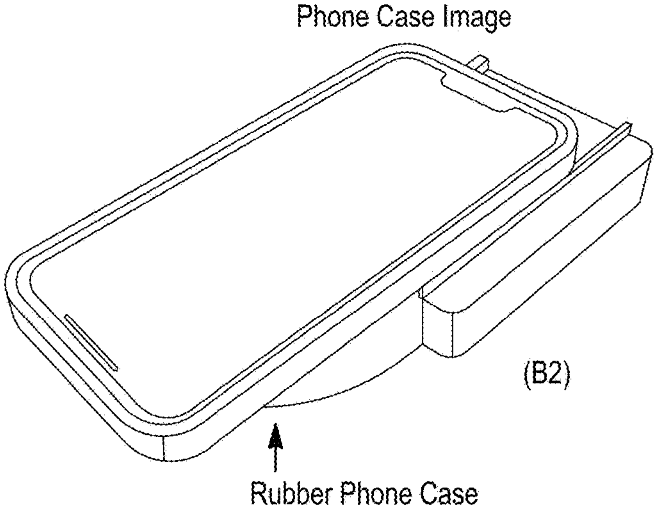
Figure 5C:
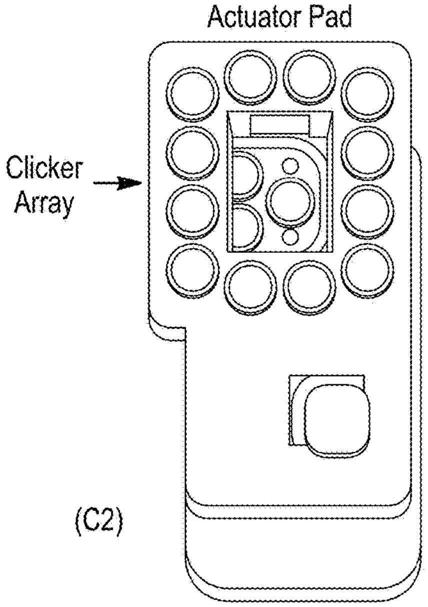
Figure 5D:
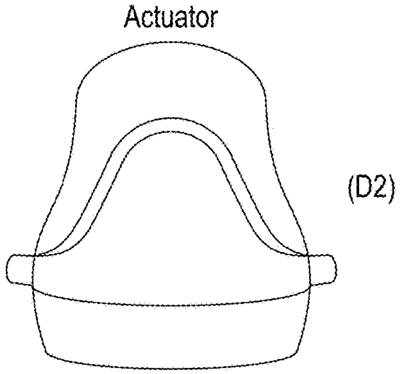

In an alternative implementation, the interaction proxy system is comprised of a handheld computing device 30 and a case 35 for the handheld computing device as seen in FIG. 3. In this arrangement, the functionality described above is split between the computing device 30 and the case 35. Corresponding components to those described above are given the same reference numbers in this alternative implementation.

The handheld computing device 30 may include at least one user interface component 21, a touchscreen interface 22, a camera 23, and a controller 26. As described above, the touchscreen interface 22 interoperates with the controller 22 to determine content displayed on a touchscreen and expose the content to a user via the user interface component 21. Additionally, the controller 26 receives input from the user, translates the input to a command for the touchscreen and communicates the command via a wireless communication link (e.g., Bluetooth standard) to the case. In this regard, the handheld computing device 30 further includes a wireless transceiver 32.

In one embodiment, the case 35 is configured to encase the handheld computing device 30. The case 35 is preferably equipped with a microcontroller 36, a wireless transceiver 37, and an actuator 38. During operation, the microcontroller 36 receives the command via the wireless transceiver 37 from the handheld computing device 30 and actuates the actuator 38 (or one actuator in an array of actuators) in response to receiving the command.

As a proof of concept, a prototype of this alternative implementation is further described below. For ease of prototype, some of the system processing was implemented on third computing device but can easily be integrated into most handheld computing device, including a smartphone.

In the prototype, the phone case receives actuation commands via a wireless transceiver and controls the actuators residing therein using a microcontroller (e.g., Arduino Nano 33 IoT). The actuation commands dictate when and which set of actuators to activate. To increase the total number of actuators supported, an I/O expander is used for actuation command signals, and a variable dual-side DC Boost converter (±3 to ±30V, 20 W total power) increases the headroom for a vast number and range of actuator types for realistic actuation needs in daily life, including physical actuation (e.g., press-down interaction pads such as on microwaves, buttons) and digital actuation (e.g., capacitive touchscreens). A 7.4V 200 mAh battery is used to power all components in the phone case.

To demonstrate the potential of supporting different actuation needs, two types of possible actuators—solenoid and capacitive screen clickers—were tested for actuating different touchscreen appliances in daily scenarios.

Solenoids can be used as an actuator to perform mechanical movements (i.e., push and pull) by supplying current to generate an electromagnetic force. For the proxy device, solenoids are used to perform a physical "press" on various interactive appliances. While the solenoid press can activate physical buttons and resistive touchscreen (which requires a forceful touch compared to capacitive screens), a small modification is required to make solenoids capable of actuating capacitive touchscreens. To achieve this, solenoids are modified with an additional conductive touch head as shown in FIG. 5. In this implementation, the head is made of conductive rubber and fiber, and its shape mimics a fingertip. It is affixed to the solenoid using heatshrink tubing. Multiple solenoids are used to increase the "reach" of the case and minimize the distance between a potential button to be pressed and an available solenoid. All touch heads are connected to the phone case and are grounded whenever the user is holding and using the phone case.

To show the compatibility of solenoids, a phone case is built with small 4.5V solenoids as actuators (see FIG. 5). Since each solenoid is 20×12×11 mm, eight solenoids are positioned around the phone case to increase the actuation area. That is, an array of solenoids are used as an actuator for interacting with a touchscreen. A custom PCB manages all of the supporting hardware for the solenoids and makes the case more compact.

While solenoid can push touchscreens similar to the single finger tapping gesture used by many touchscreen devices, it is comparatively larger and heavier to bring with the user. Since most touchscreen devices use a capacitive touchscreen, another type of actuator that specifically actuates capacitive touchscreens is evaluated.

Autoclickers alter the capacitance of the screen in the location they are in contact with the screen, thereby simulating a fingertip touch. Due to these properties, it can only be used on capacitive touchscreens and must stay in contact with the screen for valid actuation. However, since there are no moving parts, the clicker can activate almost instantly after receiving the actuation command, resulting in improved responsiveness compared to the solenoid. The fast clicking frequency allows the clicker to perform up to 35 clicks/sec, enabling the proxy device to actuate screens more responsively and accurately, which is especially important for clicking during moments of fast movement or clicking small buttons. Since the clicker is a solidstate component, it opens up the possibility of being integrated into smaller form factors, such as directly as a part of a custom PCB, that makes the proxy device sufficiently small and lightweight to be carried around for daily use cases.

To show the compatibility of clickers with the proxy device, a phone case was built with 12 clickers as actuators (see FIG. 5 bottom row). A DC boost converter is set to ±26V DC to power the clickers and connect the control pin of the clickers to the I/O expander. When an actuation command is received from the smart phone, the microcontroller sets the corresponding pin to high to activate the clicker and perform the touch gesture.

For performance evaluation, the actuation delay of the system is measured to demonstrate the responsiveness of the current prototype design. Instead of only measuring the data transmission delay, one can measure the time needed, ie., the time elapsed from the time when the smart phone sends an actuation command to the microcontroller of the phone case and ends at the time when the touchscreen received the actuation. This demonstrates the speed the proxy device can react after the target object has been recognized and the actuation is triggered. The shorter the delay, the more accurately it actuates small buttons, and the faster the user can brush on the touchscreen without accidentally overshooting and missing the target button.

Figure 6:
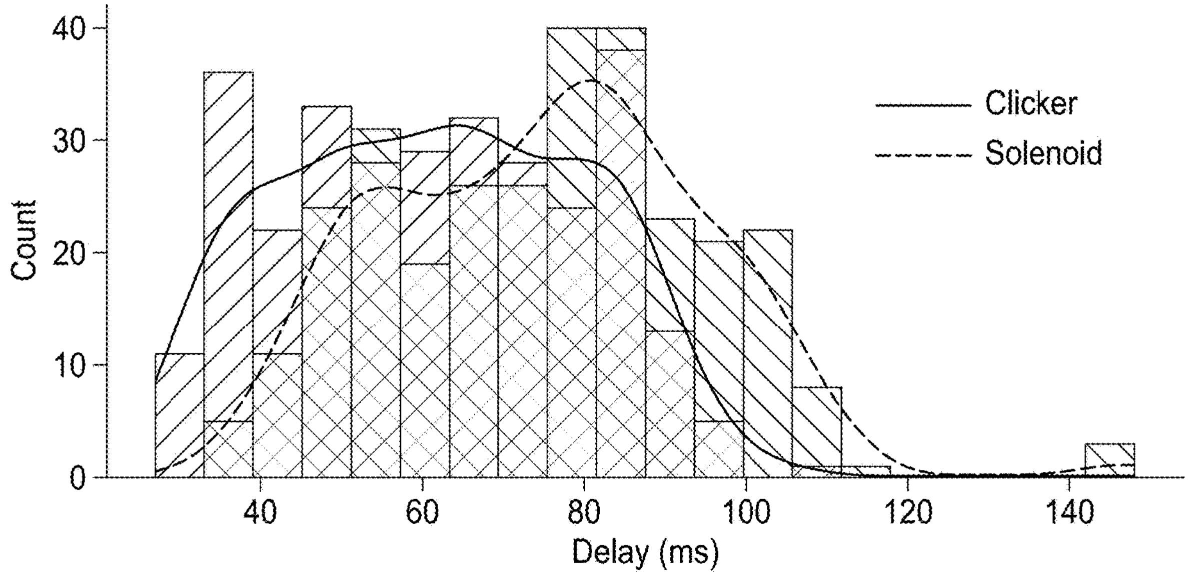
FIG. 6 is a histogram and kernel density estimate plot of the actuation delay for three hundred actuations.

Three hundred actuations were performed to measure the actuation delay, with a random sleep time between 500 ms-1500 ms between actuation commands to mimic a realistic usage scenario. The distribution of the actuation delay is shown in FIG. 6, where the delay ranges from 37 ms to 148 ms for the solenoid ($\mu$=75.27, $\sigma$=19.56), and 27 ms to 107 ms for the clicker ($\mu$=61.54, $\sigma$=18.12). Due to the mechanical movement of the solenoid, it inevitably has higher actuation delay, which is a tradeoff to consider when balancing between responsiveness and compatibility with other types of physical interface. The plot depicts a distribution that is skewed right, showing most delays are around the 30 ms-100 ms range. This shows that the actuation module, as part of the hardware proxy system, can process and perform actuations in a timely manner, allowing the proxy device to quickly reacts to detected buttons and user movements.

For device compatibility, the capacitive autoclicker and solenoid actuation approaches were tested on different touchscreen appliances used in daily life. These devices use varying touchscreen technologies and their compatibility is summarized in table 1 below.

TABLE 1

| | Touchscreen Technology | | | | | | |
|---|---|---|---|---|---|---|---|
| | Capacitive Touchscreen | | | | Resisitive Touchscreen Adafruit | Physical Touchpad and Buttons | |
| Actuator Type | Phillips 242B9T Touchscreen Monitor | SAMSUNG S7 FE Tablet | Fire HD 10 Tablet | Google Pixel 5 | Resisitive Touchscreen Overlay | Hamilton Beach Microwave | Physical Keyboard |
| Touchscreen Autoclicker | ✓ | ✓ | ✓ | ✓ | N/A | N/A | N/A |
| Solenoid | ✓ | ✓ | ✓ | ✓ | ✓ | ✓ | ✓ |

Due to the way the autoclicker activates touchscreens, it can only actuate devices that use capacitive touchscreens. However, through the compatibility test, it has been shown that it can robustly actuate different types and sizes of capacitive touchscreen devices, including large monitors (Tabletop Phillips 242B9T Touchscreen Monitor, 24"), tablets (SAMSUNG S7 FE Tablet, 12.4", Amazon Fire HD 10 Tablet, 10.1"), portable devices (Google Pixel 5, 6").

By physically pressing into the touchscreen, the solenoid is able to actuate a wide range of touchscreen appliances that support single-finger press or tap gestures. As a demonstration, the proxy device was tested with solenoid actuators on three different touchscreen technology that covers the majority of appliances that can be found in daily life, including (1) capacitive touchscreen, (2) resistive touchscreen, and (3) physical touchpad and button.

Specifically, the activation rate of both actuators is analyzed on the capacitive touchscreen to evaluate the false positive and false negative rates for actuations. The actuator is positioned at the same place on the touchscreen, performed 100 consecutive actuations on the touchscreen, and counted the number of touches that were registered. Both the solenoid and autoclicker were able to reach 100% precision and recall on actuating the target button on the screen. These results show that the actuators are able to effectively activate the screen without misses and do not actuate the screen without an explicit command from the microcontroller, reducing the risk of accidental activation.

Next, the actuation location consistency of both actuators is evaluated, checking the variance of registered touch locations given a fixed physical actuation position. This is to verify whether the actuator can consistently actuate the exact same place on the touchscreen interface, which is critical for the localization model to ensure precise actuations of desired virtual and/or physical buttons. Both the solenoid and autoclicker are used to press the same location 300 times, measured the touch locations registered on the touchscreen device, and analyzed the distribution of the location offset between the actual/desired location and the location registered on the screen.

Figure 7:
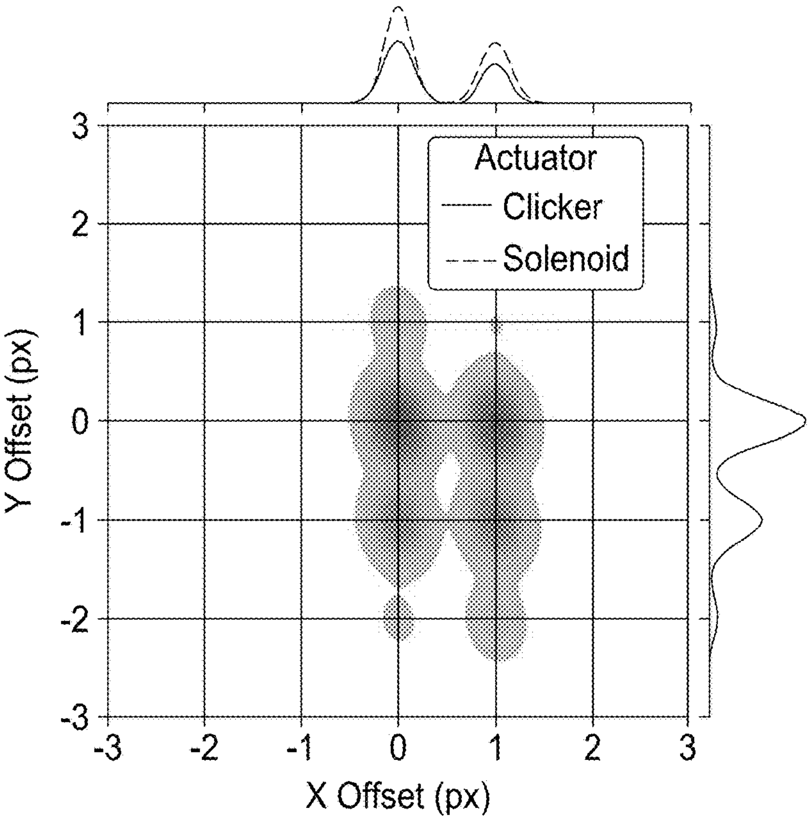
FIG. 7 is a graph showing the kernel density estimation of registered touch offset positions in pixels.

FIG. 7 shows that the position x offset is within +−1 pixel, and y offset is within −1 to 2 pixel range, where 168 out of 300 of the touches are precisely triggered at the desired location, and 268 out of 300 touches are within 1 pixel different than the desired location, showing a high accuracy and consistency of using autoclickers to register touches on the touchscreen.

To determine the pose and position of the proxy device, camera and motion sensor data is retrieved from user's cellphone, and send it to the controller for processing. In one embodiment, the controller maintains a model of the target interface, including images of each user interface (UI), type and location of UI elements, and transitions between interface states. For this disclosure, assume that the interface model is known to the controller.

Figure 8:
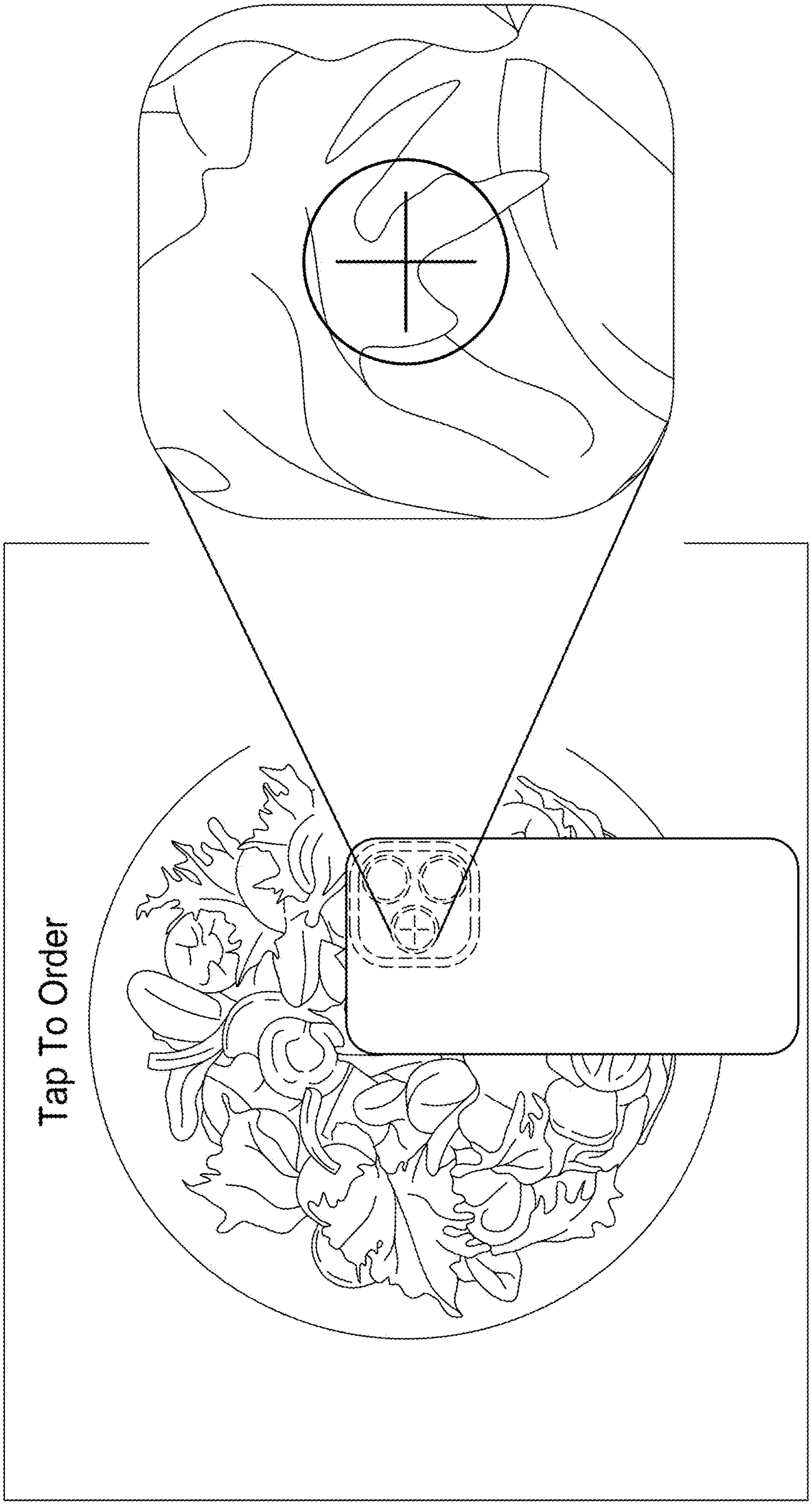
FIG. 8 depicts a model of the touchscreen and proxy device location in both a touchscreen interface coordinate and a touchscreen physical coordinate.

With reference to FIG. 8, the controller extracts feature descriptors from images and finds whether a potential match exists between the camera view and the interface image to find the position of the proxy device. The controller may further use the readings from the motion sensors to calculate the pose of the device for localization.

To speed up the processing and make the matching robust to dynamic size and camera angles, Speeded Up Robust Features (SURF) can be used for feature detection utilizing its advantages of speed, scale-invariant, and robustness against image transformations. For further information regarding SURF, reference may be made to an article by Herbert Bay et al entitles "SURF: Speeded Up Robust Features" In Computer Vision—ECCV 2006 which is incorporated by reference herein. This allows the program to run in real time, and be able to handle interfaces with different sizes and different view angles.

Since a feature matching can only provide the location in pixel units, additional steps are needed to convert pixels to units in the physical word, which is essential to estimate where the phone is relative to the touchscreen kiosk monitor (physical touchscreen reference frame), but not merely the interface image (interface image reference frame). When the device is on the touchscreen, given the camera Field of View (FoV), which can be retrieved programmatically or through device specifications, the proxy device form factor, and the transformation matrix of the matching of current camera view on the interface image, the program can calculate the ratio of converting pixel units in the interface model to millimeters in the physical word. This can be used to calculate the physical position of the proxy device, as well as all the actuators in in the phone case, relative to the physical touchscreen reference frame, which is essential for accurate button actuation for screens of different sizes.

In addition to localizing the proxy device on the 2D plane, the program continuously monitors the 3D pose of the device, making sure it is in touch with the touchscreen kiosks to avoid falsely triggering actuators while the user is moving the device in midair. This is collectively determined by (1) the transformation matrix of the feature matching results, checking whether there exists a significant perspective transformation, and (2) cellphone IMU readings, checking whether the device is suddenly tilted along X or Y axis through pitch and yaw readings while moving on the screen. Whenever program detects a possible device tilt or lifting, it pauses the processing procedure, notifies and waits the user to place the proxy device back onto the touchscreen kiosks for accurate localization.

By incorporating all the information about device location, device pose, device specification, and interface information, the program constantly tracks and updates its world model of the proxy device in the touchscreen reference frame. With the constructed world model, the program can determine the location of the proxy device, the actuators, and interface elements. This allows the proxy device to make decisions upon users' requests, including giving directional guidance and physical distance when it receives a target button to press, decomposing high level commands into a sequence of actuations based on interface transitions, and deciding when to trigger which actuator based on the current state of the proxy device.

Using the information of the world model it keeps about the interface, the proxy device tracks the location of all the actuators installed to the hardware. If any of the actuator is within the boundary of the target actuating area, it will send the actuation command to the embedded microcontroller of the phone case, for example using the Bluetooth Low Energy (BLE) protocol. To further reduce the chance of overshoot or early click, the controller sets a dynamic unsafe boundary (10% of width and height) around the actual bounding box of the target actuating area, and sends the actuation command only if the actuator is within this boundary (e.g., not near the edge of the target actuating area).

To better optimize the localization accuracy, the camera preferably has a smaller minimum focal distance for clear close-up view, and a darkfield sensor is used for precise movement tracking on reflective and transparent materials. In the example embodiment an iPhone 13 Pro is the smartphone and is equipped with an ultra-wide camera, allowing a smaller minimum focal distance. This makes it possible for the camera to focus on the touchscreen display, having a clear view of the interface even though the pad thickness is only 18 mm, which further improves the quality of feature detection.

Although a feature matching gives the precise position of the device, it is not always easy to find a match due to insufficient features (e.g., the solid color used in buttons and background), and the small portion of the screen that is visible to the camera. To accommodate these cases, a darkfield sensor may be used to provide precise device movement to supplement device localization. The use of darkfield laser tracking also enables measuring relative movement on different types of surfaces, including glasses or other reflective surfaces that are commonly used with touchscreen kiosks but are challenging or even impossible for camera system and optical sensors to track movement. This allows the proxy device to support a wider range of touchscreen devices and be used in various daily scenarios. When movement is detected, the sensor sends 2D movement deltas to controller. Based on the current device pose, the controller calculates the device movement in the global coordinates, and adds it to the current positions.

Through moving the proxy device along a sequence of 20 points on a food ordering interface, it shows an average of 47 px ($\sigma$=34.27) error between the actual position and the estimated position. Notice that the proxy device is moved to the 20 points in sequence, thus the error may accumulate while moving, until a feature matching is found to reset the error. This shows the feasibility of using keypoint and mouse collaboratively to localize in featureless situations, while demonstrates possibility of technical improvement for better accuracy.

To reduce limitations of existing touchscreen appliances, the proxy device uses an accessible software interface running on mobile devices to better capture users' interaction intention, and provide an improved hardware interface for users to more easily use the proxy device on inaccessible touchscreens.

When the target button on the touchscreen is small and close to other buttons nearby, user may need multiple touches for the touchscreen to register the touch on the button, or may mistakenly trigger undesired nearby buttons. As shown in FIG. 9B, to reduce these limitations, the proxy device may act as a button magnifier, detecting buttons near the proxy device, and projecting them in a much larger scale on users' cellphone, allowing users to use target button, where the length indicates how far the button is. A user can roughly move towards that direction, and the proxy device continuously monitors the position of all actuators. If any of the actuators is on top of the button, it will press the button directly, allowing users to delegate the job of doing fine motor control and performing touchscreen-assumed interaction gestures to the proxy device.

Figure 9A:
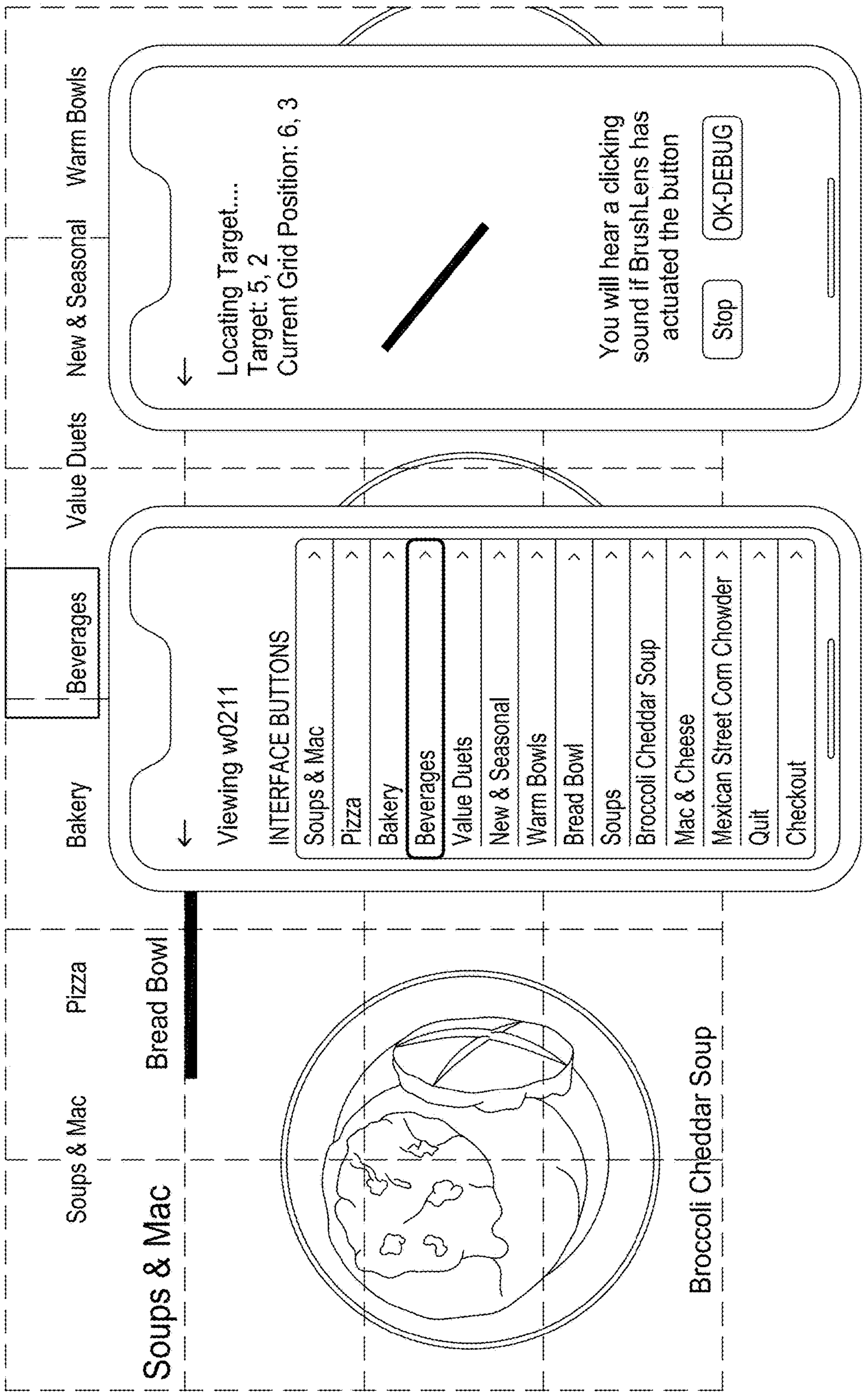
FIGS. 9A-9C illustrate a proxy device interactions with a touchscreen.
Figure 9B:
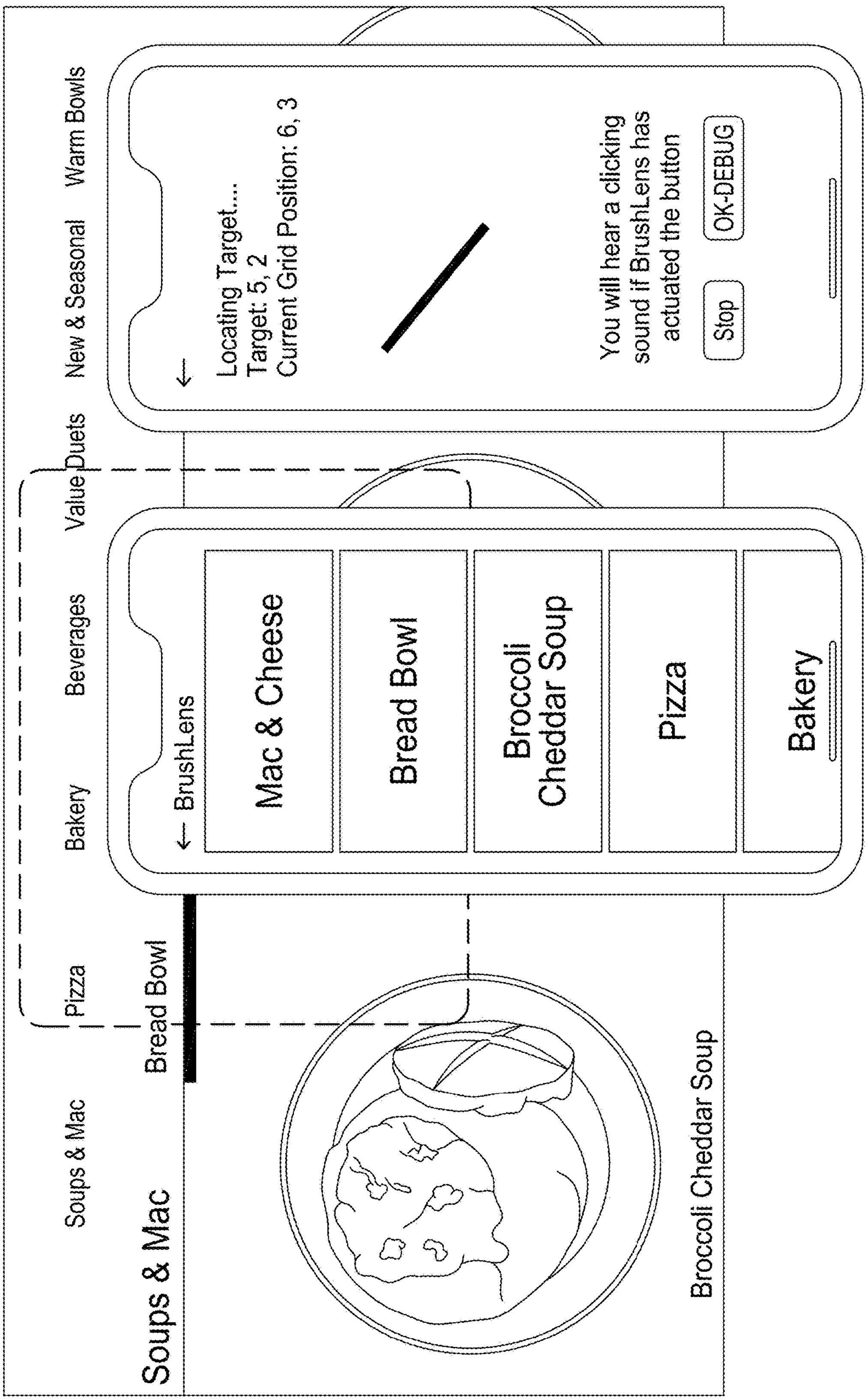

The touchscreen interface of the proxy device also supports an interface exploration mode, as shown in FIG. 9A, which shows UI elements of the target inaccessible screen on the users' cellphone, allowing users to use assistive technologies, such as VoiceOver, to explore inaccessible touchscreens. With the interface model, the controller sends the JSON file of the UI layout, including clickable buttons and labels, to a proxy device app. User can use existing screen readers on mobile devices to explore the options, and select the button they want to press. Once the target is selected, the proxy device app will give audio descriptions guiding the user towards the target button on the touchscreen.

In order to give directional guidance on where to move the proxy device, a grid system is used as an example demonstration of how audio feedback could be a sufficient way of giving user movement guidance. Other known guidance systems can also be easily integrated into the proxy device app.

To achieve the grid system guidance system, the controller divides the touchscreen interface into grids. Each cell is set to be 1"×1", and the number of rows and columns are determined by the actual size of the screen measured by proxy device localization system. This ensures that user can maintain a constant mental model of how large the individual cell is, and can better map the grid system to touchscreens of different sizes. The controller constantly sends the grid coordinate of the target button and the device location to the proxy device app, and the app speaks out these coordinates continuously, allowing users to move the proxy device towards the target button in this coordinate system, until any actuator clicked the target button. When button is actuated, the proxy device app initiates a vibration, an clicking sound effect, and also an audio description saying which button is pressed, to keep the user notified about the actuation.

Interacting with touchscreen appliances has been shown to take much more time for visually and motor impaired users. This additional inefficiency comes from not only the interaction itself, but also the time spent on the repetitive steps, such as listening to the menu description every time. This could easily become unnecessary if the user is already familiar with the interface layout, and want to perform frequent and routine interactions. Interactions that require sequential input can easily magnifies this efficiency difference, causing additional frustrations to users. In the context of using touchscreen devices, this includes typing credit card and address information on the virtual keyboard, or even achieving a goal on touchscreen UI as it usually requires more than one interaction to navigate through the interface menu hierarchy.

Figure 9C:
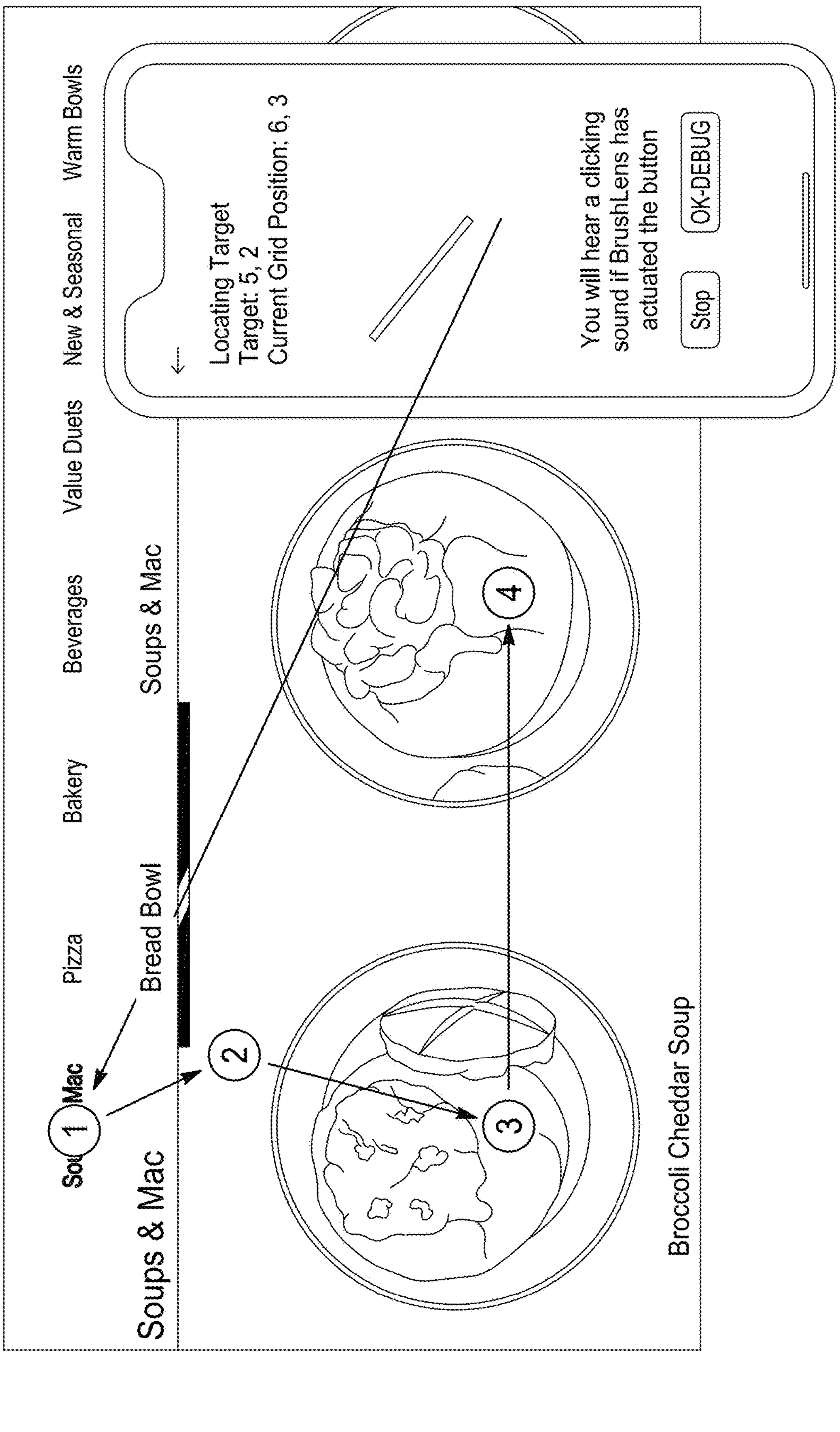

Aiming for further simplifying the interaction experience, the proxy device supports sequential and frequent input support with an interaction routine mode on the proxy device app, as shown in FIG. 9C. Similar to interaction routine and script in other domains, this allows users to record a sequence of input to be used next time, which can easily be used on saving commonly used information (e.g., name, address, phone number) and interaction routines (e.g., order the coffee and bread everyday morning). With a saved interaction routine, the proxy device can directly navigates user through a sequence of buttons to press, saving the time needed to explore the menu and select the button at a specific step of this routine.

The techniques described herein may be implemented by one or more computer programs executed by one or more processors of the proxy device. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for accessing a touchscreen using an interaction proxy device, comprising:

determining, by an interaction proxy device, content displayed on a touchscreen;

exposing, by the interaction proxy device, the content to a user of the interaction proxy device;

detecting, by the interaction proxy device, a sequence of inputs from the user, where each input in the sequence of inputs indicates a command for the touchscreen;

recording, by the interaction proxy device, the sequence of inputs in a script;

subsequently executing, by the interaction proxy device, the script in response to a trigger from the user; and actuating an actuator of the interaction proxy device according to the script, thereby activating user interface elements of the touchscreen.

2. The method of claim 1 further comprises determining, by the interaction proxy device, location of the touchscreen in relation to the interaction proxy device.

3. The method of claim 2 wherein the location of the touchscreen is determined using at least one of a camera or a motion sensor.

4. The method of claim 2 further comprises actuating an actuator in response to detecting the input and thereby activating the user interface element.

5. The method of claim 4 wherein actuating the actuator includes supplying current to a solenoid in order to actuate the solenoid.

6. The method of claim 4 wherein actuating the actuator includes supplying voltage to a capacitance circuit in order to activate the user interface element.

* * * * *